US009769281B2

(12) United States Patent
Braskich et al.

(10) Patent No.: US 9,769,281 B2
(45) Date of Patent: Sep. 19, 2017

(54) METHOD AND APPARATUS FOR DETERMINING A MULTIMEDIA REPRESENTATION FOR A MULTIMEDIA ASSET DELIVERED TO A CLIENT DEVICE

(75) Inventors: Anthony J. Braskich, Palatine, IL (US); Stephen P. Emeott, Rolling Meadows, IL (US); Alfonso Martinez Smith, Algonquin, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1308 days.

(21) Appl. No.: 13/329,702

(22) Filed: Dec. 19, 2011

(65) Prior Publication Data

US 2013/0159455 A1 Jun. 20, 2013

(51) Int. Cl.
*G06F 15/16* (2006.01)
*H04L 29/08* (2006.01)
*H04L 29/06* (2006.01)

(52) U.S. Cl.
CPC ........ *H04L 67/303* (2013.01); *H04L 65/4084* (2013.01); *H04L 65/605* (2013.01); *H04L 65/80* (2013.01); *H04L 67/2823* (2013.01)

(58) Field of Classification Search
CPC ... H04L 67/2823; H04L 67/303; H04L 65/80; H04L 65/4084
See application file for complete search history.

(56) References Cited

U.S. PATENT DOCUMENTS

| 7,925,774 | B2 | 4/2011 | Zhang et al. |
| 7,945,616 | B2 * | 5/2011 | Zeng et al. ................... 709/203 |
| 7,953,880 | B2 | 5/2011 | Deshpande |

(Continued)

OTHER PUBLICATIONS

Tao Yu and Kwei-Jay Lin: "A Broker-Based Framework for QoS-Aware Web Service Composition", Proceeding EEE '05 Proceedings of the 2005 IEEE International Conference on e-Technology, e-Commerce and e-Service (EEE'05) on e-Technology, e-Commerce and e-Service, IEEE Computer Society, Washington, DC, USA, Mar. 29,-Apr. 1, 2005, all pages.

(Continued)

*Primary Examiner* — Scott B Christensen
*Assistant Examiner* — Thomas Richardson
(74) *Attorney, Agent, or Firm* — Young Basile Hanlon & MacFarlane, P.C.

(57) ABSTRACT

A method (1000) and apparatus (110) determine a multimedia representation for a multimedia asset. The method includes receiving (1020) a multimedia asset request for a multimedia representation at a multimedia representation broker (110). The multimedia asset request is received from a specific client device (120). The multimedia asset request includes client device information about the specific client device (120). The method determines (1030), at the multimedia representation broker (110), a multimedia representation for use in providing the multimedia asset to the specific client device (120) based on the client device information and based on media representations appropriate for a client device context of the specific client device (120). The method outputs (1040) multimedia representation information corresponding to the multimedia asset for the specific client device (120) based on the determined multimedia representation.

19 Claims, 10 Drawing Sheets

(56) References Cited

U.S. PATENT DOCUMENTS

| | | | |
|---|---|---|---|
| 7,953,882 | B2 | 5/2011 | Shukla et al. |
| 7,958,536 | B2 | 6/2011 | Gordon et al. |
| 7,965,626 | B2 | 6/2011 | Tan et al. |
| 7,966,408 | B2 | 6/2011 | Schramm et al. |
| 8,639,369 | B1* | 1/2014 | Clark .................. G10L 25/69 700/94 |
| 2002/0169797 | A1* | 11/2002 | Hegde et al. ............. 707/500.1 |
| 2004/0025180 | A1* | 2/2004 | Begeja ............ G06F 17/30017 725/46 |
| 2008/0189412 | A1 | 8/2008 | Wang et al. |
| 2010/0031366 | A1* | 2/2010 | Knight .................. G06Q 10/10 726/26 |
| 2010/0167816 | A1* | 7/2010 | Perlman et al. ............... 463/30 |
| 2010/0223407 | A1* | 9/2010 | Dong et al. ..................... 710/70 |
| 2010/0235438 | A1 | 9/2010 | Narayanan et al. |
| 2011/0103374 | A1 | 5/2011 | Lajoie et al. |
| 2011/0107364 | A1 | 5/2011 | Lajoie et al. |
| 2011/0107379 | A1 | 5/2011 | Lajoie et al. |
| 2011/0202674 | A1 | 8/2011 | Su et al. |
| 2011/0276712 | A1* | 11/2011 | Narula ................ H04L 65/4092 709/231 |
| 2013/0031162 | A1* | 1/2013 | Willis et al. ................... 709/203 |
| 2015/0089076 | A1* | 3/2015 | Reza ............................. 709/231 |

OTHER PUBLICATIONS

Stockhammer, Thomas: "Dynamic Adaptive Streaming over HTTP Design Principles and Standards", MMSys '11 Proceedings of the second annual ACM conference on Multimedia systems, ACM, New York, NY 2011, all pages.

Serhani, M. Adel et al.: "A QoS Broker Based Architecture for Efficient Web Services Selection", Proceeding ICWS '05 Proceedings of the IEEE International Conference on Web Services, IEEE Computer Society, Washington, DC, 205, all pages.

Schulzrinne, H. et al.: "RTP: A Transport Protocol for Real-Time Applications", Request for Comments: 3550, Jul. 2003, all pages.

Fielding, R. et al.: "Hypertext Transfer Protocol—HTTP/1.1", Request for Comments: 2616, Jun. 1999, all pages.

Neureiter, G. et al.: "The Brain Quality of Service Architecture for Adaptable Services with Mobility Support", Personal Indoor and Mobile Radio Communications, 2000, PIMRC 2000. The 11th IEEE International Symposium on vol. 1 pp. 445-450.

Nahrstedt, Klara et al.: "The QoS Broker", Technical Reports (CIS) 1994, all pages.

Mahajan, Manish et al.: "Managing QoS for Multimedia Applications in the Differentiated Services Environment", Journal of Network and Systems Management, 2003, vol. 11, pp. 469-498.

Kassler, Andreas et al.: "Concepts for Service Adaptation, Scalability and QoS Concepts on Mobility enabled Networks", Proceeding of the IST Global Summit 2001, Barcelona, Spain, Sep. 2001, all pages.

Jouve, Wilfried et al.: "A Multimedia-Specific Approach to WS-Agreement", published in European Conference on Web Services 2006, inria-00353585, version 1—Jan. 15, 2009, all pages.

Fitzpatrick, Tom et al.: "Supporting Adaptive Multimedia Applications through Open Bindings", Proceedings Fourth International Conference on configurable Distributed Systems Cat No. 98EX159 (1998), Publisher: IEEE Comput. Soc., pp. 128-135.

3GPP TS 26.247 v10.0.0 (Jun. 2011), 3rd Generation Partnership Project; Technical Specification Group Services and System Aspects; Transparent end-to-end Packet-switched Streaming service (PSS); Progressive Download and Dynamic Adaptive Streaming over HTTP (3GP-DASH) (Release 10), all pages.

* cited by examiner

US 9,769,281 B2

METHOD AND APPARATUS FOR DETERMINING A MULTIMEDIA REPRESENTATION FOR A MULTIMEDIA ASSET DELIVERED TO A CLIENT DEVICE

FIELD OF THE INVENTION

The present disclosure is directed to a method and apparatus for determining a multimedia representation for a multimedia asset delivered to a client device. More particularly, the present disclosure is directed to determining multimedia representations for use in providing a multimedia asset to a specific client device.

BACKGROUND OF THE INVENTION

Client devices used in today's society include mobile phones, personal digital assistants, smartphones, set-top boxes, multimedia playback devices, desktop computers, tablets, portable computers, gaming devices, and various other electronic communication devices. Many of these client devices play live and stored multimedia assets, such as television shows, movies, music, sporting events, and other live and stored multimedia assets. A media delivery system can stream the live and stored multimedia assets to client devices, where the media delivery system may support a plurality of multimedia representations for each asset. A multimedia representation is an instance of a multimedia asset based on the video encoding, the audio encoding, or the delivery protocol used to deliver the multimedia asset. For example, while a multimedia asset consists of a single piece of content, each multimedia asset may have several multimedia representations. Each multimedia asset may have several multimedia representations because different multimedia representations permit the multimedia asset to be consumed on a variety of client devices. This is because different client devices have different capabilities. For example, desktop computer monitors typically have higher resolutions than smartphones, and wired set-top box connections stream data faster than wireless laptop connections.

Unfortunately, a problem exists in determining which media representation is appropriate when delivering a multimedia asset to a specific client device. For example, a Hypertext Transfer Protocol (HTTP) adaptive streaming media server may have the capability to serve a wide range of multimedia representation variants for each multimedia asset to accommodate different types of client devices and network connections. However, not all of the multimedia representation variants are appropriate for every client device. For example, the resolution of one variant may not be optimal for a given client device, the bitrate requirement of another variant may be too high for a given client device connection, or other variants may not be suitable for certain client devices.

BRIEF SUMMARY

A multimedia representation is determined for a multimedia asset. A multimedia asset request for a multimedia asset is received at a multimedia representation broker. The multimedia asset request is received from a specific client device. The multimedia asset request includes client device information about the specific client device. The multimedia representation broker determines a multimedia representation for use in providing the multimedia asset to the specific client device based on the client device information and based on media representations appropriate for a client device context of the specific client device. Multimedia representation information corresponding to the multimedia asset for the specific client device is output based on the determined multimedia representation.

BRIEF DESCRIPTION OF THE SEVERAL VIEWS OF THE DRAWINGS

In order to describe the manner in which advantages and features of the disclosure can be obtained, various embodiments are illustrated in the appended drawings. Understanding that these drawings depict only typical embodiments of the disclosure and do not limit its scope, the disclosure is described and explained with additional specificity and detail through the use of the drawings in which.

DETAILED DESCRIPTION

A method and apparatus determine a multimedia representation for a multimedia asset delivered to a client device. The method can include receiving a multimedia asset request for a multimedia asset at a multimedia representation broker. The multimedia asset request can be received from a specific client device of at least one client device. The multimedia asset request can include client device information about the specific client device. The method can include determining, at the multimedia representation broker, a multimedia representation for use in providing the multimedia asset to the specific client device based on the client device information and based on media representations appropriate for a client device context of the specific client device. The method can include outputting multimedia representation information corresponding to the multimedia asset for the specific client device based on the determined multimedia representation.

Figure 1:
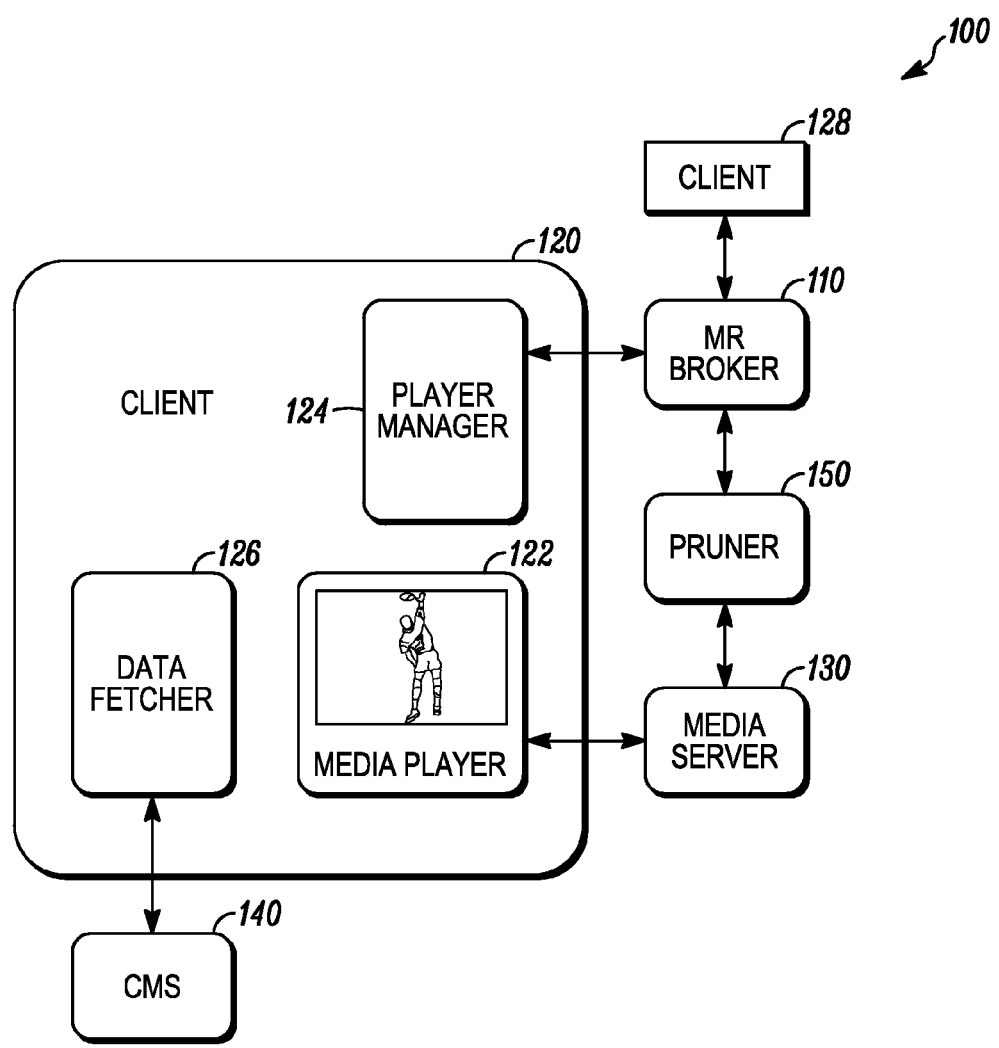
FIG. 1 illustrates an example diagram of a system in accordance with a possible embodiment.

FIG. 1 is an example block diagram of a system 100 according to one possible embodiment. The system 100 includes a multimedia representation broker 110, a client device 120, a media server 130, a content management system 140, a pruner 150, and at least one other client device 128. The client device 120 includes a media player 122, a player manager 124, and a data fetcher 126. The client device 120 negotiates with the content management system 140, the multimedia representation broker 110, and the media server 130 to determine a multimedia representation for delivery to the client device 120. The content management system 140 maintains a catalog of multimedia assets, presents lists of assets to the client device 120 as requested, and provides links to the multimedia representation broker 110 for each multimedia asset. For example, the content management system 140 can contain a catalog of television shows, movies, music, live broadcasts, newscasts, sporting events, programs that can be watched, channels that can be viewed, and other multimedia assets. The client device 120 can browse the catalog of multimedia assets via the data fetcher 126 to determine a desired multimedia asset for consumption and can send a corresponding multimedia asset request to the multimedia representation broker 110. The multimedia representation broker 110 can negotiate with the client device 120 to determine appropriate, such as optimal and desired, multimedia representations of a particular multimedia asset to deliver to the client device 120 and can direct the client device 120 to the appropriate multimedia representations, such as at the media server 130. For example, the multimedia representation broker 110 can determine the best combinations of resolutions, data rates, encoding methods, and other characteristics of multimedia representations for delivery to the client device 120. The pruner 150 can be an element of the multimedia representation broker 110 that can edit media manifest files at the media server 130 as needed to create custom manifest files for client devices on request. For example, the pruner 150 can hide or shave off multimedia representations in a manifest that are undesirable for presenting a multimedia asset at the client device 120, such as multimedia representations at resolutions beyond the display capabilities of the client device 120. The media server 130 streams multimedia representations and serves manifests to the client device 120.

Figure 2:
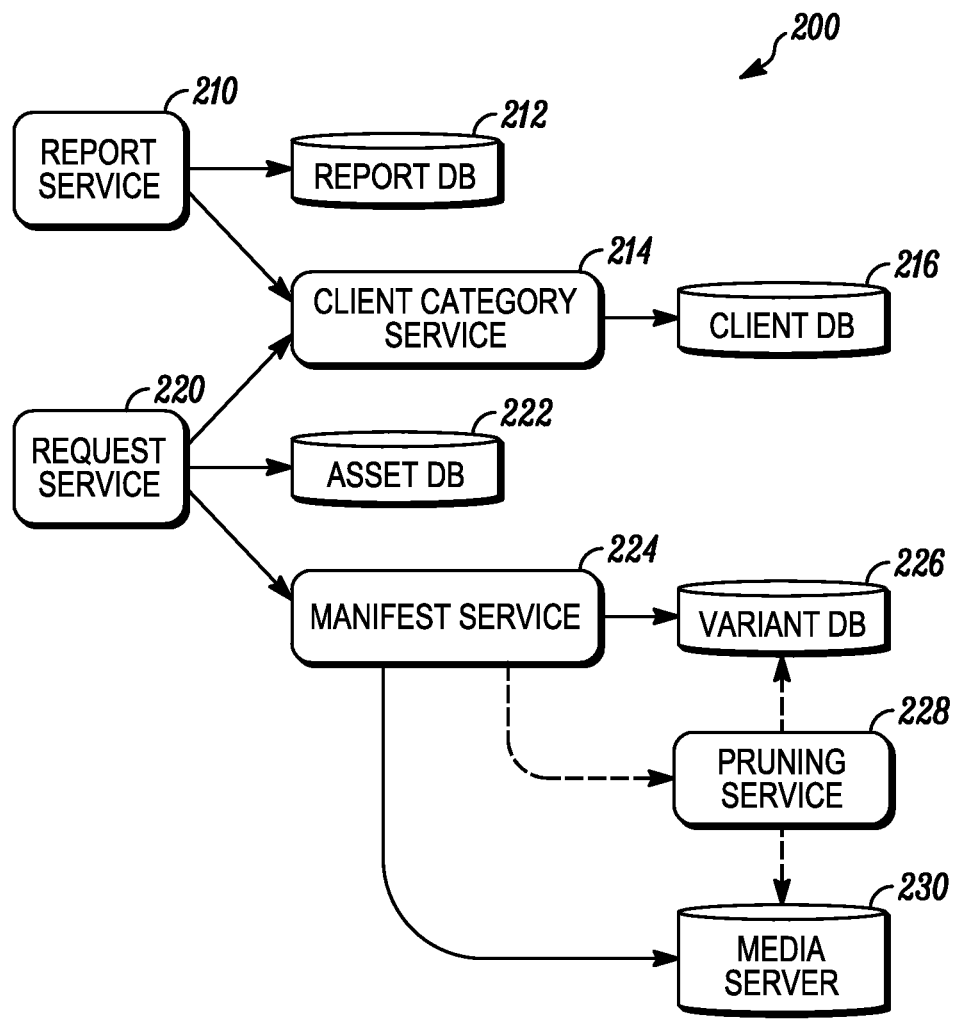
FIG. 2 is an example block diagram of a multimedia representation broker according to a possible embodiment.

FIG. 2 is an example block diagram of a multimedia representation broker 200, such as the multimedia representation broker 110, according to a possible embodiment. The multimedia representation broker 200 includes a report service 210, a report database 212, a client category service 214, and a client database 216. The multimedia representation broker 200 also includes a request service 220, an asset database 222, a manifest service 224, a variant database 226, a pruning service 228, and a media server 230, such as the media server 130. The multimedia representation broker 200 processes both reports from clients and requests for manifest files from clients. The report service 210 can receive reports from a plurality of client devices about whether or not their playback experience was successful. This can enable the multimedia representation broker 110 to learn over time what device contexts, such as what types of devices, had successful or unsuccessful playback experiences with different multimedia representations. The request service 220 processes client device requests for particular multimedia assets. The pruning service 228, such as the pruner 150, edits media manifest files using the variant database 226 and the media server 230. The media server 230, such as the media server 130, provides multimedia representations corresponding to a desired multimedia asset to the client device 120.

Figure 3:
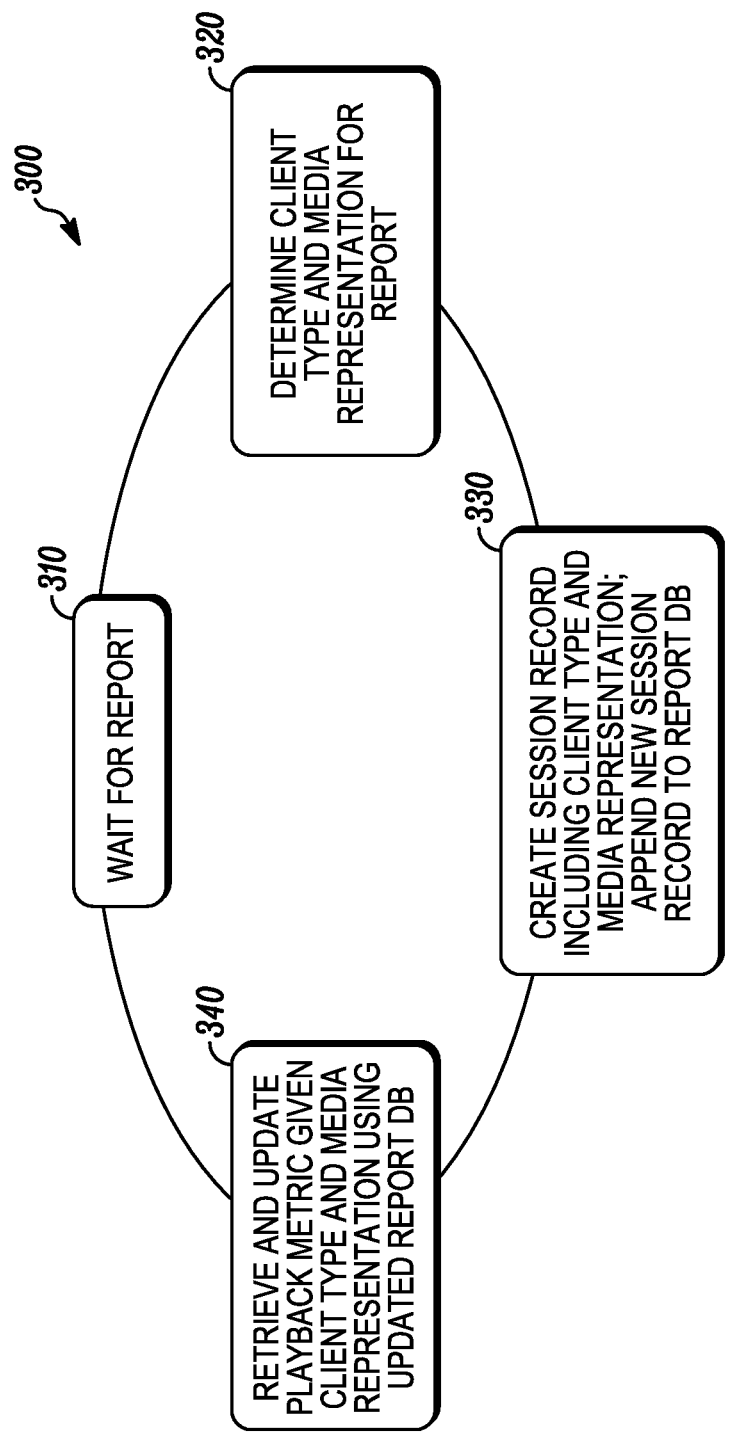
FIG. 3 is an example process diagram illustrating operation of a report service of the multimedia representation broker of FIG. 2 according to a possible embodiment.

FIG. 3 is an example process diagram 300 illustrating operation of the report service 210 of the multimedia representation broker 200 according to a possible embodiment. At 310, the report service 210 waits for a client report. At 320, report service 210 determines the client type and the media representation descriptor for the report. The client type can be included in the report, can be obtained from the client database 216 via a client category service 214, or a combination thereof. At 330, the report service 210 creates a new session record including a client type and a media representation descriptor from the report and appends the new session record to the report database 212. At 340, the report service 210 retrieves and updates a playback metric for a given client type and a given media representation using the updated report database 212. For example, one technique to update a playback metric includes assigning a weight value to each received report and computing the weighted average of the received reports. The weight value may be determined from whether the playback of the multimedia asset was successful or was a failure, may be determined from the duration of playback, may be determined from the reason for playback stopping, may be determined from the details of any error that occurred during playback, including a software stack trace, may be determined from the age of the report, may be determined from the client device context, and may be determined from any other information that may be present in the report. The playback metric can be used to determine a multimedia representation for use in providing a multimedia asset to a specific client device.

Figure 4:
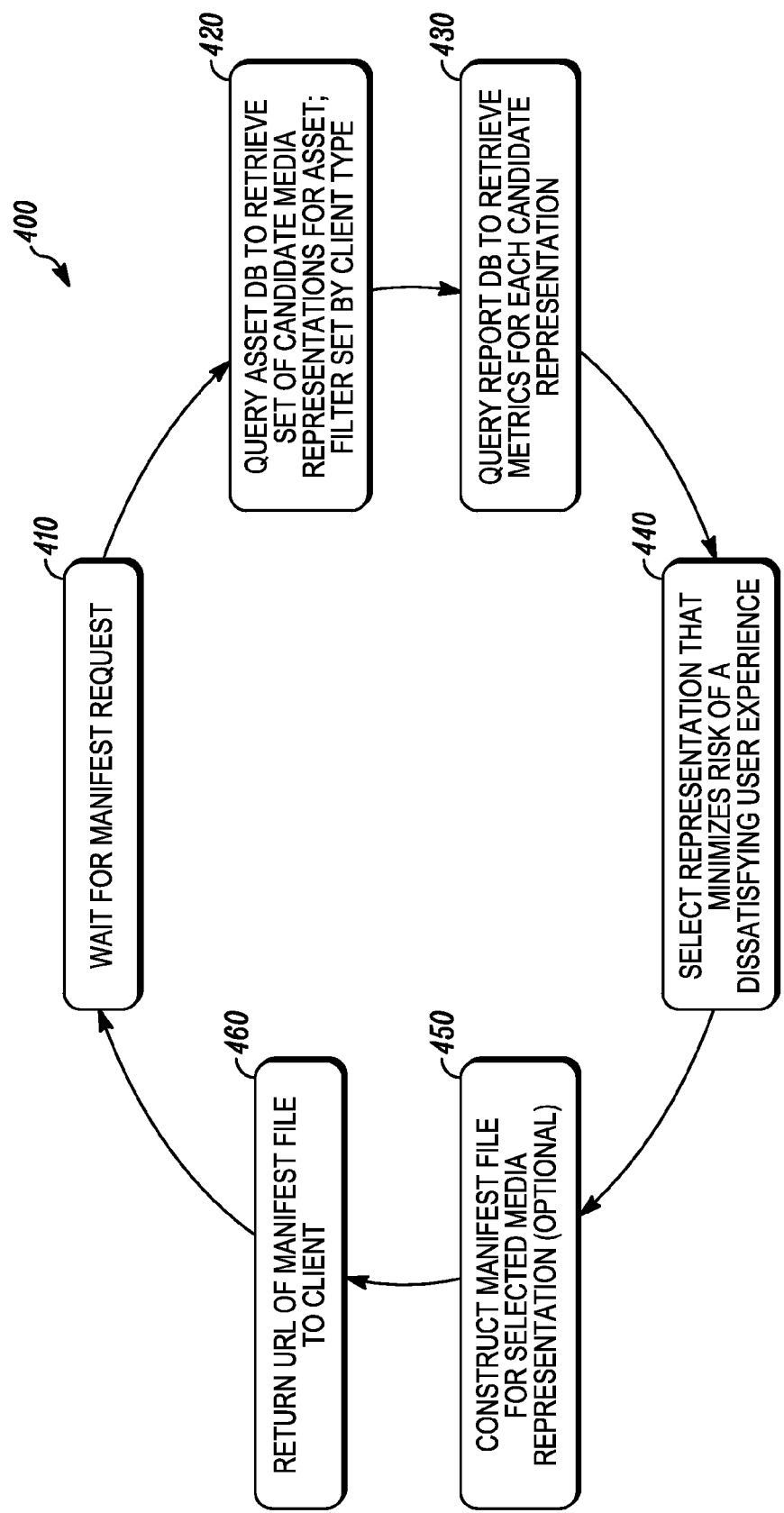
FIG. 4 is an example process diagram illustrating operation of a request service of the multimedia representation broker of FIG. 2 according to a possible embodiment.

FIG. 4 is an example process diagram 400 illustrating operation of the request service 220 of the multimedia representation broker 200 according to a possible embodiment. At 410, the request service 220 waits for and receives a manifest request. At 420, the request service 220 queries the asset database 222 to retrieve a set of candidate multimedia representations for a multimedia asset and filters the set by client type. At 430, the request service 220 queries the report database 212 to retrieve metrics for each candidate multimedia representation. At 440, the request service 220 selects at least one multimedia representation that minimizes a risk of a dissatisfying user experience. At 450, the request service 220 constructs a manifest file for the selected multimedia representation. At 460, the request service 220 returns a Universal Resource Locator (URL) of the manifest file to the requesting client device.

Figure 5:
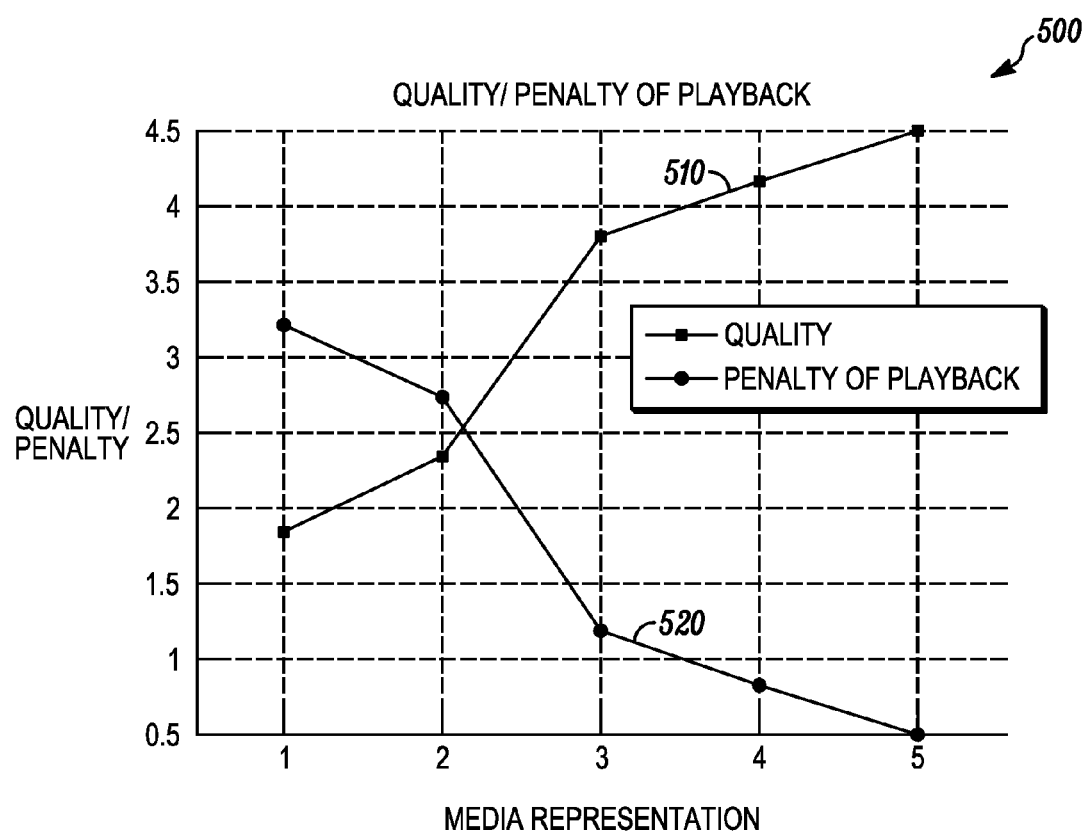
FIG. 5 is an example graph of quality of playback and penalty of playback for different multimedia representations according to a possible embodiment.

FIG. 5 is an example graph 500 of quality of playback 510 and penalty of playback 520 for different multimedia representations 1 through 5 according to a possible embodiment. The graph 500 is an example of the utilization of inputs and reports available to the multimedia representation broker 110. Reports can come from an entire population of users of a same device class. The quality 510 can be the quality perceived by the user, such as a numeric score computed from the encoding bitrate, such as a numeric score measuring subjective evaluation of perceptual video quality, including a mean opinion score or an estimate thereof, or any other indicator of quality of playback perceived by a user. The penalty of playback 520 can indicate the cost of playback. For example, one penalty measure can be the cost of the video encoding or the amount by which the quality of the multimedia presentation differs from the maximum possible quality. To elaborate on an example, if the maximum possible quality is $Q_{max}$, and this representation has quality Q, then the penalty measure for this representation can be $Q_{max}-Q$. The lower quality video may have the best chance of successful playback but may not look as good because it was encoded at a low bit rate. Thus, the penalty can be a measure of the shortfall of quality experienced by the user in the playing back of the video. In this example graph 500, there are five multimedia representations, 1 through 5, to select from for a particular multimedia asset. The first multimedia representation 1 has the lowest quality as shown by 510, such as the lowest bit rate, and the highest penalty of playback as shown by 520. The fifth media representation 5 has the highest quality as shown by 510 and the lowest penalty of playback as shown by 520.

Figure 6:
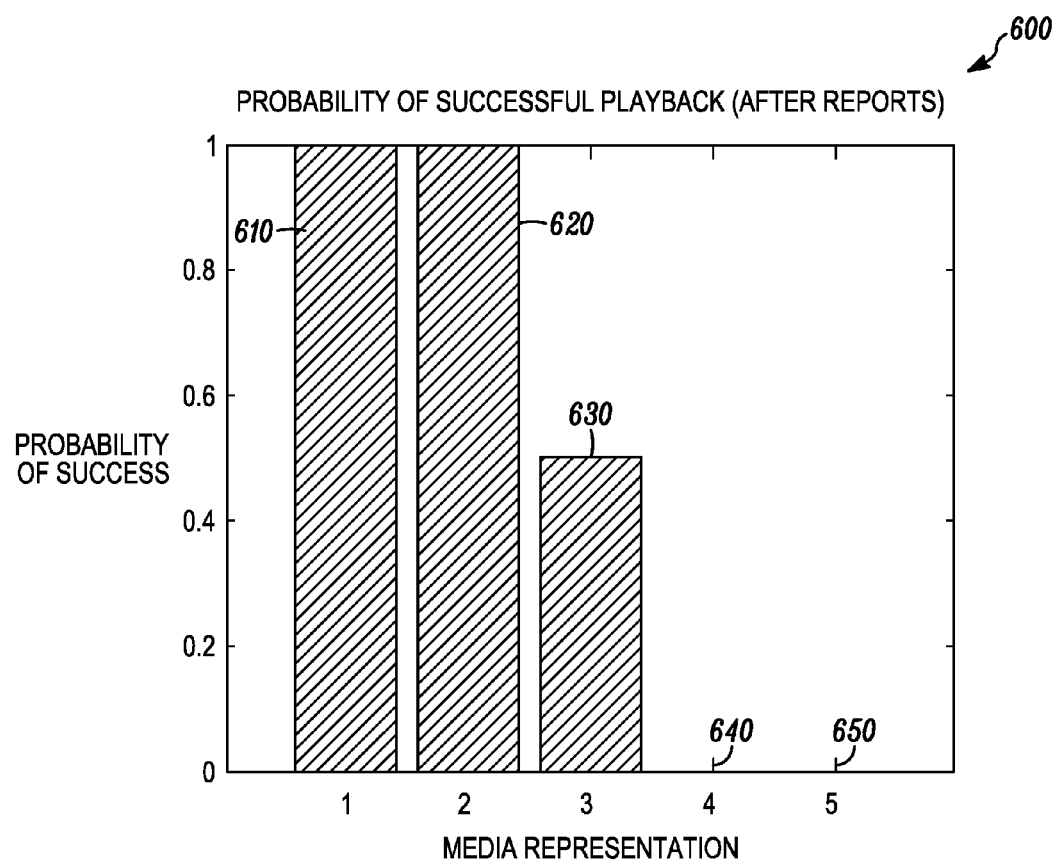
FIG. 6 is an example graph of probability of successful playback for different multimedia representations according to a possible embodiment.

FIG. 6 is an example graph 600 of probability of successful playback of a multimedia representation to completion 610, 620, 630, 640, and 650, which can be an indicator of a penalty measure for the five different multimedia representations 1 through 5 according to a possible embodiment. The graph 600 is another example of utilization of inputs and reports available to the multimedia representation broker 110. Again, reports can come from the entire population of users of the same device class. In this example, the probability of successful playback 610 and 620 for multimedia representations 1 and 2 can be 100% for a given context. For example, the multimedia representation broker 110 may have received all successful playback client reports for playbacks of multimedia representations 1 and 2. The probability of successful playback 630 for multimedia representation 3 can be 50% for a given context. Also, the probability of successful playback 640 and 650 of multimedia representations 4 and 5 can be 0% for a given context. For example, the multimedia representation broker 110 may have received all failed playback client reports for playbacks of multimedia representations 4 and 5. The graphs 500 and 600 can be two example ingredients for what the multimedia representation broker 110 computes as the risk or the expected incurred cost of playback of different multimedia representations. The multimedia representation broker 110 can then pick the multimedia representation that has the lowest cost, or risk, for playback for a specific client device context.

Figure 7:
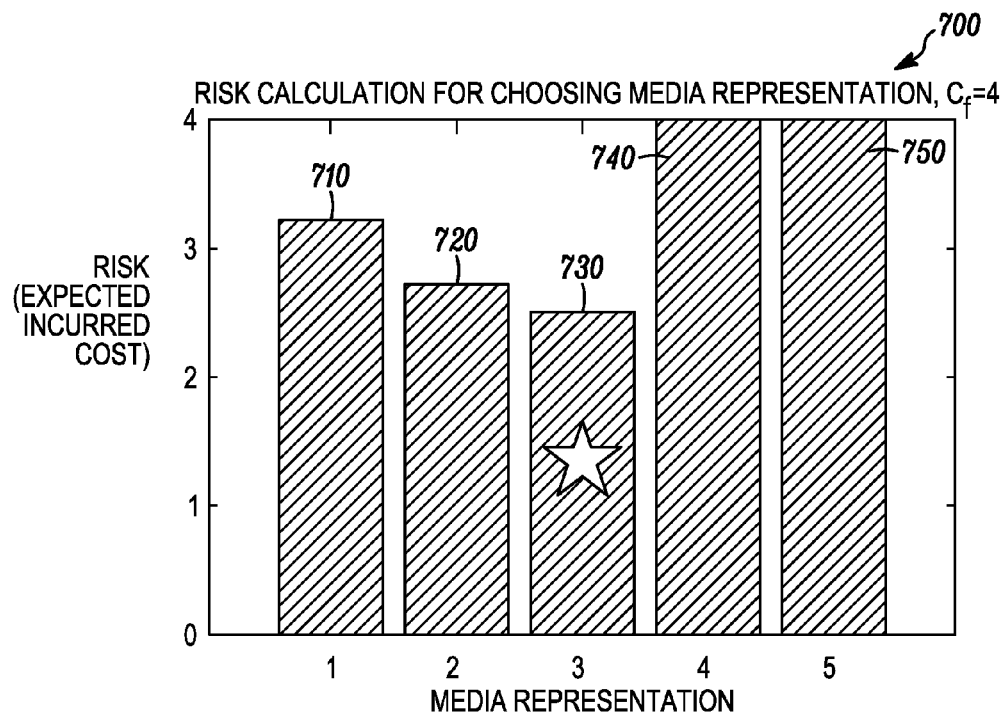
FIG. 7 is an example graph of the risk of playback for different multimedia representations according to a possible embodiment.

FIG. 7 is an example graph 700 of the risk, or expected incurred cost 710, 720, 730, 740, and 750 of playback for the five different multimedia representations 1 through 5 according to a possible embodiment. According to this example, risk, or expected incurred cost, may be computed from the penalty of playback, as shown in the graph 500, the probability of successful playback of the multimedia representation to completion, as shown in the graph 600, and a measure of recent failed playback attempts. According to this example, the multimedia representation broker 110 would pick the third multimedia representation for playback at a specific client device in a particular context because it has the lowest incurred cost or risk 730. It can be noted that the fourth and fifth multimedia representations have the highest risk at least based on the fact that they had unsuccessful playback, as shown in the graph 600.

Figure 8:
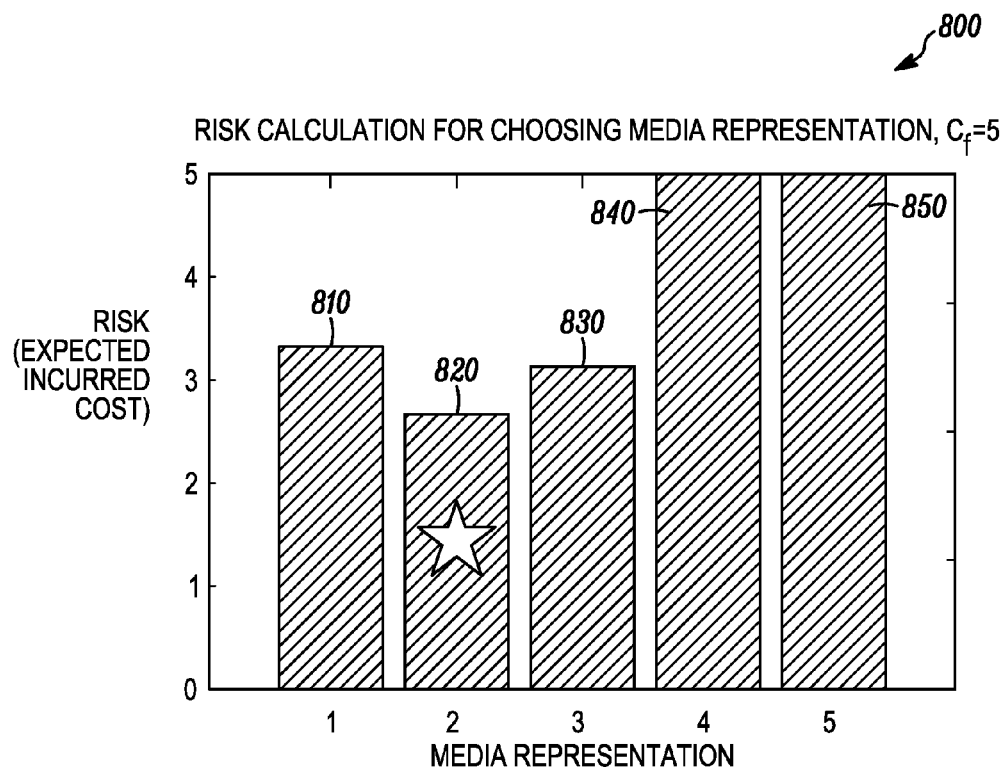
FIG. 8 is an example graph of the risk of playback for different multimedia representations according to a possible embodiment.

FIG. 8 is an example graph 800 of the risk, or expected incurred cost, 810, 820, 830, 840, and 850 of playback for the five different multimedia representations 1 through 5 according to a possible embodiment. According to this example graph 800, another report can come in after the risk was calculated for graph 700. This other report can indicate that a client device attempted to play back the third multimedia representation in a particular context and the playback failed. The multimedia representation broker 110 can then reduce the probability of success of the third multimedia representation in the particular context, which can increase the risk 830, which can result in the second multimedia representation having the lowest risk 820. Then, the multimedia representation broker 110 can pick the second multimedia representation for playback for a specific client device context.

Figure 9:
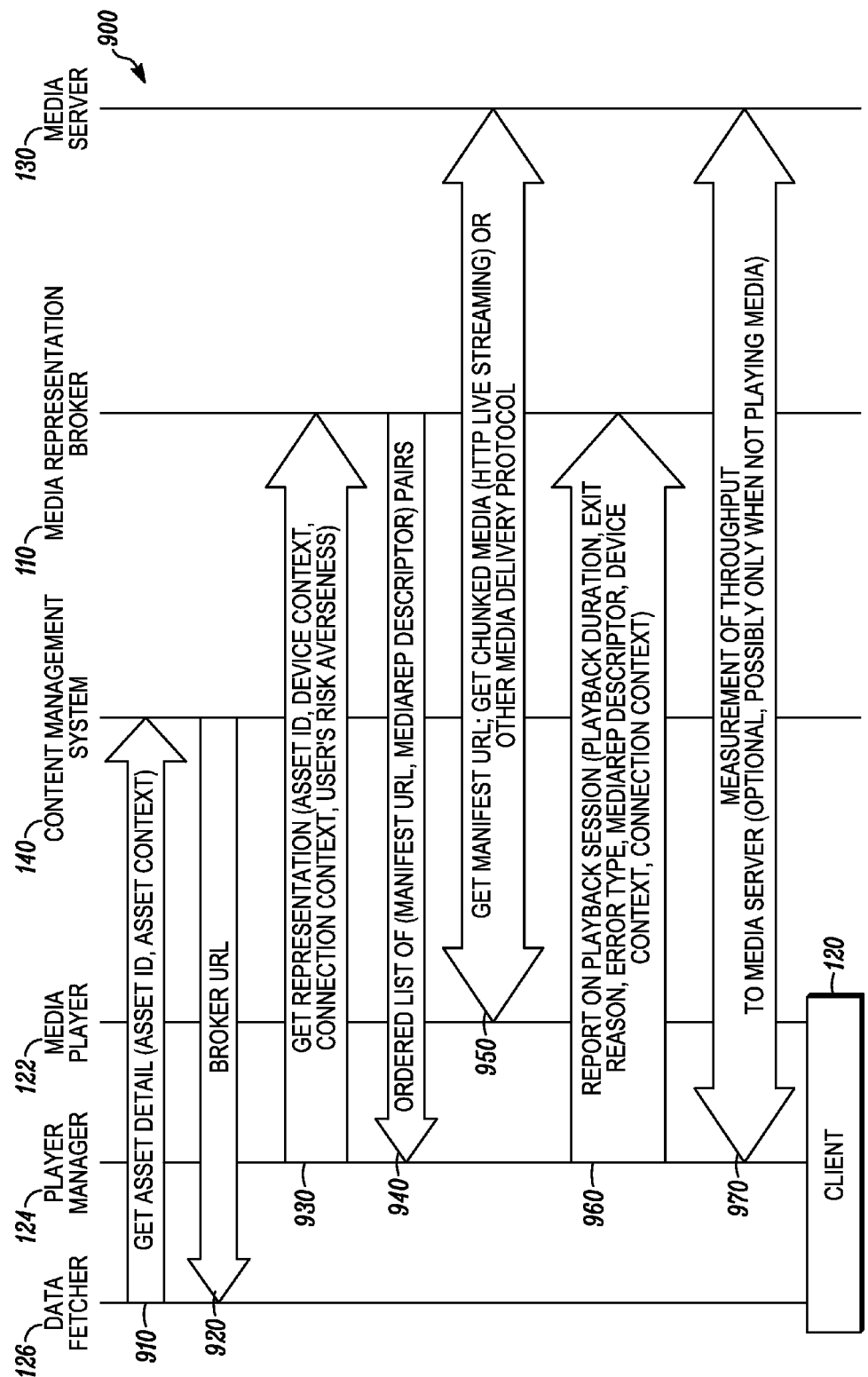
FIG. 9 is an example flow diagram of signals among a client device, a content management system, a media representation broker, and a media server according to a possible embodiment.

FIG. 9 is an example flow diagram 900 of signals among the data fetcher 126, the player manager 124, and the media player 122 at the client device 120 and the content management system 140, the media representation broker 110, and the media server 130 according to a possible embodiment. At 910, the content management system 140 gets multimedia asset detail information, such as multimedia asset identification and multimedia asset context, from the data fetcher 126. At 920, the content management system 140 returns a multimedia broker URL to the data fetcher 126. At 930, the multimedia representation broker 110 gets a multimedia representation, including information such as multimedia asset identifier, client device context, connection context, and a measure of recent failed playback attempts from the player manager 124. At 940, the media representation broker 110 sends an ordered list of pairs, such as including a multimedia asset URL and a multimedia representation descriptor, to the player manager 124. The ordering of the multimedia representation descriptors in the list can indicate the appropriateness of the representation. For example, the first representation listed may be the most appropriate for the client device 120. At 950, the media player 122 and the media server 130 exchange media delivery protocol information, such as a manifest URL and chunked media, for HTTP live streaming. At 960, the player manager 124 sends a client report on the playback session of the multimedia representation. The client report can include playback duration, a reason for exiting playback, an error type during playback, a media representation descriptor, a client device context, a connection context, and other information about playback of the multimedia representation at the client device 120. At 970, the player manager 124 and the media server 130 exchange measurements of the throughput to the media server 130.

Figure 10:
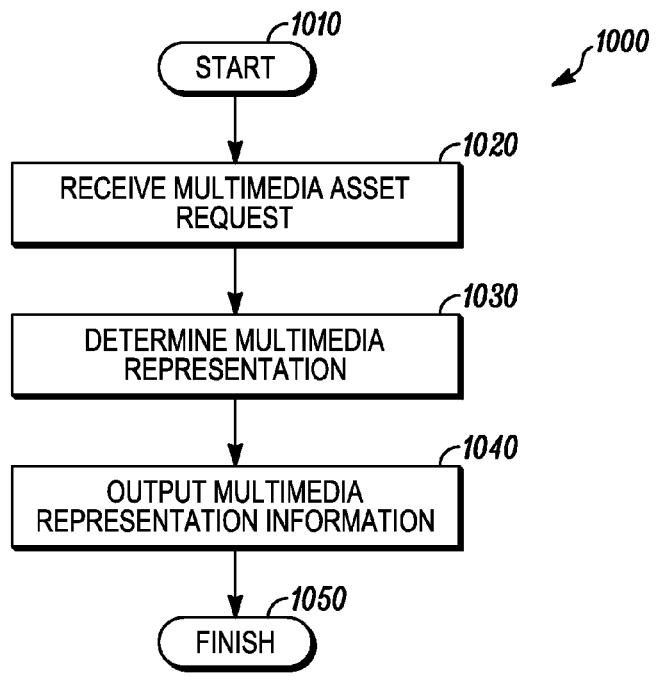
FIG. 10 illustrates an example flowchart illustrating the operation of a media representation broker according to a possible embodiment.

FIG. 10 illustrates an example flowchart 1000 illustrating the operation of the media representation broker 110 according to a possible embodiment. At 1010, the flowchart begins. At 1020, a multimedia asset request for a multimedia asset is received at a multimedia representation broker 110. The multimedia asset request can be received from a specific client device. The multimedia asset request can include client device information about the specific client device. A multimedia asset can be independently describable with a unique identifier A multimedia asset can include audio multimedia data, video multimedia data, and other multimedia data. Also, a multimedia asset can be content that can be consumed by a user of a client device 120. For example, a multimedia asset can be a movie, an episode of a television show, a song, or any other multimedia that can be consumed by a user of a client device 120. As a further example, a multimedia asset can be an element of multimedia content, such as a video, available to a user. A multimedia asset may have been previously recorded and stored, in which case it can be a Video on Demand (VOD) asset. Alternatively, the multimedia asset may be a live program that can be broadcast at the time the user requests it, in which case the multimedia asset can be a live asset. An asset may not refer to a specific recording format or file format. For example, a multimedia asset can refer an episode of a television show, can be a live stream of a sporting event, can be a master copy of a movie, or can be any other multimedia asset.

According to a related embodiment the multimedia asset request can be received from a server acting as an agent or proxy for one or more client devices 120, wherein the server may aggregate requests or anticipated requests from the one or more client devices 120 and wherein such requests may include client device information collected about the client device 120. For example, a server, such as the content management system 140 in FIG. 1, can query the multimedia representation broker 110 on behalf of a client, which can allow the data fetcher 126 to present an appropriate representation to the media player 122.

At 1030, a multimedia representation can be determined for use in providing the multimedia asset to the specific client device 120 based on the client device information and based on media representations appropriate for a client device context of the specific client device 120. For example, a multimedia asset can exist in one of many different multimedia representations, and many different multimedia representations can exist for a multimedia asset. As a further example, the multimedia asset can include a plurality of segments, and multiple multimedia representations can exist for each of the plurality of segments. A representation of a multimedia asset can be streamed, can be a multimedia file, or can be otherwise provided to a client device. A multimedia representation can be one of a plurality of multimedia formats with which the multimedia asset is conveyed to a client device 120. A multimedia representation for use in providing the multimedia asset to the specific client device 120 can be determined based on the client device information, based on a quality of the multimedia representation, based on a success probability of playback of the multimedia representation at a client device 120, and based on a measure of recent failed playback attempts. For example, the client device information of the multimedia asset request can include a measure of recent failed playback attempts at the specific client device 120. The measure of recent failed playback attempts may include a quantity of failed playback attempts during a fixed amount of time, a listing of times at which failed playback attempts occurred, or any other measure of failed playback attempts.

As mentioned above, a multimedia asset can be independently describable with a unique identifier for a content management system 140. For example, a particular television show can have a particular episode of a particular season. Each of the multimedia representations can also be independently identifiable. For example, a particular episode of a particular season of a particular television show can exist in many multimedia representation formats, such as a digital video disc format, a compressed video file format, a high-definition digital video format, a streaming video format, and other formats, such as many formats with which a multimedia media asset can be conveyed to clients. Multiple different multimedia representations, such as multiple formats, of the same multimedia media asset can be sent to a client device 120 for consumption of the multimedia media asset. For example, a multimedia broker 110, on behalf of a client device 120, can select which multimedia representation of a plurality of representations is used for playback of a particular multimedia asset. A multimedia representation can comprise a superset of a multimedia formats. For example, a given multimedia format can have different bit rates, different resolutions, different encoding profiles, for the format, and a client device 120 can jump from one bit rate to another while playing back a multimedia asset in a given format. Thus, a multimedia representation can have at least one or a plurality of formats. For example, a multimedia representation can be a given format at a given bit rate. Thus, a multimedia representation can be a format plus other attributes of the format. As a further example, a multimedia representation can be an instance of a multimedia asset characterized by the video or audio encoding of the multimedia asset or by the delivery protocol used to deliver the multimedia asset. While a multimedia asset can be a single piece of content, such as an episode of a television series, one multimedia asset may have several multimedia representations. Multiple multimedia representations can permit the multimedia asset to be consumed on a variety of client devices 120, such as set-top boxes, mobile phones, tablets, and other types of client devices 120. For example, an episode of a television show can have a multimedia representation with video encoded using H.264 Baseline Profile Level 3.0 at 1,000,000 bits per second, with a picture size of 640×360 pixels, with audio encoded using AAC at 64 kbps, contained in an MPEG-4 file format. Also, different multimedia representations can be consumed by a given client device 120, such as based on the client device context where a data rate of transmission to the client device 120 may change.

A client device context can include a device type of the client device 120, a hardware version of the client device 120, an operating system version of the client device 120, an media player type operating on the client device 120, a media player vendor, media player capabilities on the client device 120, a network type or connection for the client device 120, network performance for the client device 120, or any other client device context. The requesting client device 120 can send context information or a broker can otherwise obtain or store the context information. For example, the multimedia asset request can include the client device context information. The client device context information can include a client device location, can include a data speed of a data connection of the client device 120 to a network, can include feedback from a user of the client device 120 regarding playback of multimedia data in the client device context, and can include other client device context information.

At 1040, multimedia representation information corresponding to the multimedia asset for the specific client device 120 can be output based on the determined multimedia representation. Outputting can include providing a streaming multimedia asset universal resource locator for an origin server to the specific client device 120 based on the determined multimedia representation. Outputting can also include other methods of providing a multimedia representation. At 1050, the flowchart 1000 finishes.

Figure 11:
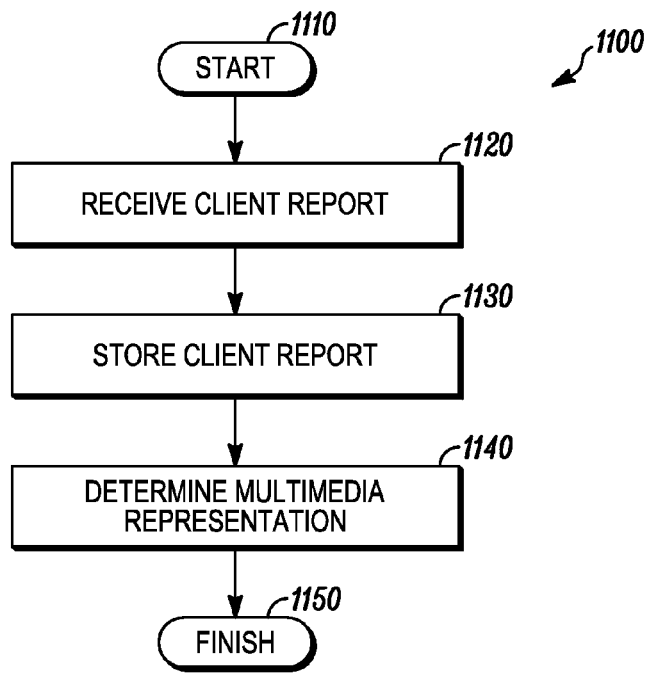
FIG. 11 illustrates an example flowchart illustrating the operation of a media representation broker according to a possible embodiment.

FIG. 11 illustrates an example flowchart 1100 illustrating the operation of the media representation broker 110 according to a possible embodiment. At 1110, the flowchart begins. At 1120, at least one client report is received at the multimedia representation broker 110. The client report can be received from at least one client device 120. The client report can correspond to multimedia asset data playback at the client device 120. Client reports can be received from each of a plurality of client devices 120. Each client report from each of the plurality of client devices 120 corresponds to multimedia asset playback at each of the plurality of client devices 120. The client device context from element 1030 in the flowchart 1000 can be determined based on the client report. For example, a client report can include details about playback failures discussed above, and the client reports can be sorted by client type for determination of a particular client device context. At 1130, each client report is stored in a memory to generate a history of client reports.

At 1140, a multimedia representation is determined for use in providing the multimedia asset to the specific client device 120 based on the client device information, based on the at least one client report, based on a history of client reports, or based on any combination thereof. At least one of each client report can include information on failed playback of a multimedia representation of a multimedia asset at at least one client device 120. At 1150, the flowchart 1100 finishes.

For example, the multimedia representation broker 110 may receive at least one client report or can have preknowledge regarding multimedia asset data playback information at the client device 120. As a further example, information regarding multimedia asset playback can already be stored, programmed, or trained into a system, such as uploaded regularly by an operator or stored elsewhere, regarding multimedia asset playback at different client devices 120. This information can be used to determine a multimedia representation for playback of a multimedia asset at a client device 120.

Figure 12:
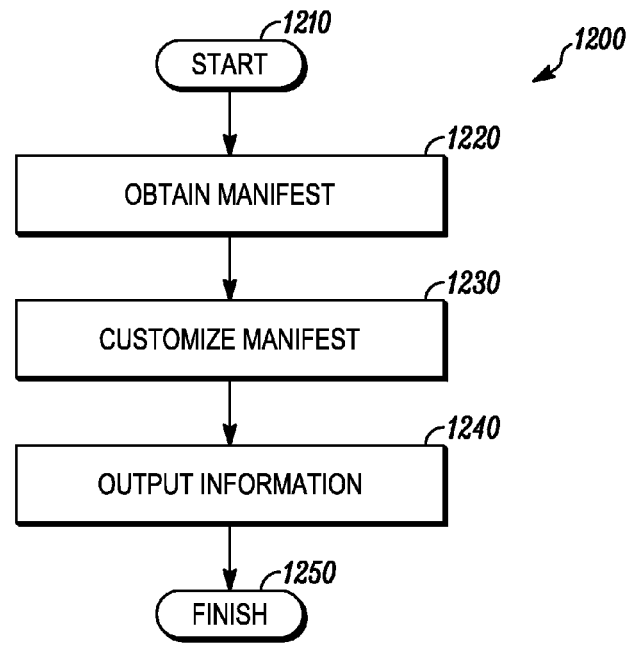
FIG. 12 illustrates an example flowchart illustrating the operation of a media representation broker according to a possible embodiment.

FIG. 12 illustrates an example flowchart 1200 illustrating the operation of the media representation broker 110 according to a possible embodiment. At 1210, the flowchart 1200 begins. At 1220, a manifest of the multimedia asset is obtained from an origin server of the multimedia asset. At 1230, the manifest of the multimedia asset is customized to generate a customized multimedia asset manifest. For example, the manifest of the multimedia asset can be pruned to eliminate unwanted multimedia representation variants based on the determined multimedia representation to generate a pruned multimedia asset manifest. At 1240, information for delivering multimedia representation data corresponding to the customized or pruned multimedia asset manifest is output to a specific client device 120 based on the determined multimedia representation. At 1250, the flowchart 1200 finishes.

For example, multimedia representation information can include a multimedia manifest. The multimedia manifest can include a list of multimedia representations a client device 120 can play back, how the client device 120 can play back a multimedia asset, where the client device 120 can obtain multimedia representations of the multimedia asset, and other multimedia representation information. The multimedia representation can also include a universal resource locator to a multimedia manifest file or to a media format. A manifest of the multimedia asset can refer to a list of other playlists, such as a variant playlist. Each listed item can be an address of an individual playlist. Each individual playlist can correspond to one multimedia representation and can contain addresses of the fragments or chunks of actual multimedia data and the audio and video to play. The manifest of the multimedia asset can also contain information about several multimedia representations, all together in a single file, where nesting of variant and individual playlists may not occur. A manifest of a multimedia asset can also refer to a component of HTTP Adaptive Streaming, such as an index that lists the fragments or chunks that make up a multimedia file. A client device 120 can typically first obtain a manifest for a multimedia asset. The manifest can permit the client device 120 to download and play the fragments or chunks. In some protocols, manifests may be nested. As a further example, a playlist can be a text file containing the addresses, such as URLs of the chunks.

HTTP Adaptive Streaming is a collection of communication protocols designed to deliver multimedia content via the HTTP protocol. Examples include HTTP Live Streaming (HLS), smooth streaming, and HTTP dynamic streaming. Most protocols can be characterized by dividing the video into "fragments" or "chunks," which can be delivered via HTTP. Such protocols may permit the client to switch between "variant streams," such as encodings at different bitrates, as conditions vary. Each variant stream can be a unique multimedia representation. Such a protocol can allow client devices to switch between a set of multimedia representations.

According to some embodiments, all of the blocks of each flowchart are not necessary. Additionally, the flowcharts or blocks of the flowcharts may be performed numerous times, such as iteratively. For example, the flowcharts may loop back from later blocks to earlier blocks. Furthermore, many of the blocks can be performed concurrently or in parallel processes. Also, blocks of different flowcharts can be combined with other flowcharts.

Figure 13:
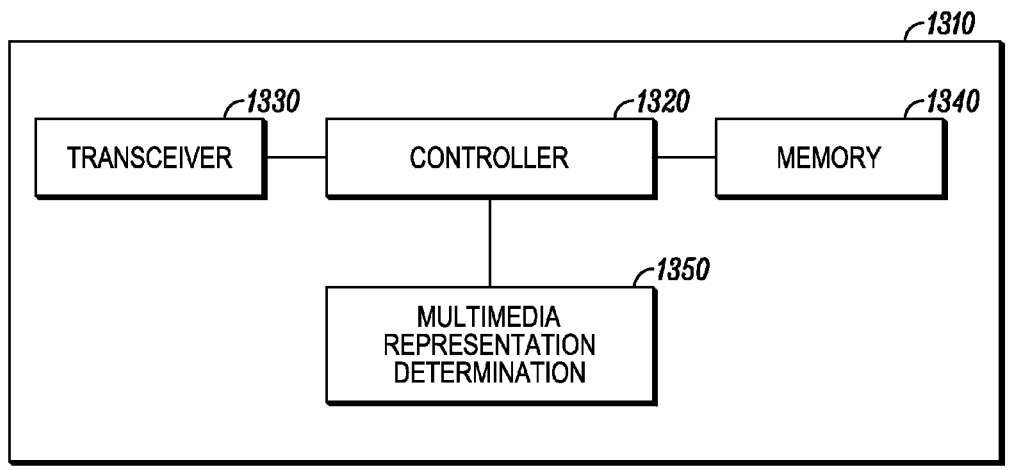
FIG. 13 is an example block diagram of a media representation broker according to a possible embodiment.

FIG. 13 is an example block diagram of a media representation broker, such as the media representation broker 110, according to a possible embodiment. The media representation broker 110 includes a housing 1310, a controller 1320, a transceiver 1330, a memory 1340, and a multimedia representation determination module 1350. The transceiver 1330 includes a transmitter, a receiver, a wireless transceiver, a wired transceiver, or any other combination of modules that can transmit or receive data. The controller 1320 controls the operations of the media representation broker 110. The memory 1340 includes a random-access memory, a read-only memory, an optical memory, flash memory, a hard drive, or any other memory that can be coupled to a media representation broker 110. The multimedia representation determination module 1350 is coupled to the controller 1320, can reside within the controller 1320, can reside within the memory 1340, can be an autonomous module, can be software, can be hardware, or can be in any other format useful for a module for a media representation broker 110.

In operation, the transceiver 1330 receives a multimedia asset request for a multimedia asset at the multimedia representation broker 110. The multimedia asset request is received from a specific client device 120. The multimedia asset request can include client device information about the specific client device 120. The client device information of the multimedia asset request can include a measure of recent failed playback attempts at the specific client device 120. The multimedia asset request can also include client device context information and other information.

The multimedia representation determination module 1350 determines a multimedia representation for use in providing the multimedia asset to the specific client device 120 based on the client device information and based on media representations appropriate for a client device context of the specific client device 120. The multimedia representation determination module 1350 outputs multimedia representation information corresponding to the multimedia asset for the specific client device 120 based on the determined multimedia representation.

The transceiver 1330 receives at least one client report at the multimedia representation broker 110. The at least one client report is received from at least one client device 120. The at least one client report can correspond to multimedia asset data playback at the at least one client device 120. At least one client report can include information on failed playback of a multimedia representation of a multimedia asset at at least one client device 120. The client device context can be determined based on at least one client report. For example, a client report can include details about playback failures, and the client reports can be sorted by client type for determination of a particular client device context. The multimedia representation determination module 1350 determines a multimedia representation for use in providing the multimedia asset to the specific client device 120 based on the client device information and based on the at least one client report.

The multimedia representation determination module 1350 obtains a manifest of the multimedia asset from an origin server of the multimedia asset. The multimedia representation determination module 1350 can customize the manifest of the multimedia asset to generate a customized multimedia asset manifest. The multimedia representation determination module 1350 outputs multimedia representation information by outputting information for delivering multimedia representation data corresponding to the customized multimedia asset manifest to the specific client device 120 based on the determined multimedia representation.

Some embodiments solve a problem of the determination of one of the media representations for use in streaming a multimedia asset to a client device 120. Embodiments can be extensible to support a wide variety of devices 120 with a wide variety of playback capabilities and to support the future introduction of new devices 120 and new media representations. Embodiments can be used in applications, for example, where a media guide listing one or more media assets is presented to the user, and depending upon the client device 120 utilized by the user, where a system can provide appropriate links to media that may be played on that client 120. For example, an HTTP Adaptive Streaming media server may have the capability to serve a wide range of variants for each asset to accommodate different types of client devices 120 and network connections. However, not all of the variants may be appropriate for every client 120. For example, the resolution may not be optimal and the bitrate may be too high for a given client device context. Embodiments can allow a client device 120 to select a subset of these variants such that an appropriate manifest of multimedia representations can be obtained for individual assets. Embodiments can be deployed as custom middleware between a client application and its multimedia player. Embodiments can also be deployed as custom streaming adaptation middleware in the data plane or bundled with a multimedia server.

Embodiments can amass client reports, use these reports in an intelligent way to influence selection of a multimedia representation, and dynamically customize an adaptive streaming manifest file for use by a plurality of mobile devices 120 supporting differing playback capabilities.

The methods of this disclosure may be implemented on a programmed processor. However, the operations of the embodiments may also be implemented on non-transitory machine-readable storage having stored thereon a computer program having a plurality of code sections that include the blocks illustrated in the flowcharts or a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

We claim:

1. A method comprising:
receiving, by a system including a processor, a plurality of client reports from a plurality of client devices, each of the plurality of client reports comprising playback information describing playback of a multimedia representation from a plurality of multimedia representations of a multimedia asset;
determining and storing, by the system based on the plurality of client reports, a plurality of playback metrics, each of the plurality of playback metrics associated with a different combination of a client type and a multimedia representation from the plurality of multimedia representations, and each of the plurality of playback metrics being a probability of successful playback of the associated multimedia representation on a client device of the associated client type, wherein the probability is calculated based on a number of client reports from the plurality of client reports that indicate successful playback of the associated multimedia representation on the associated client type and a number of client reports from the plurality of client reports that indicate failed playback of the associated multimedia representation on the associated client type;
receiving, by the system from a requesting client device, a multimedia asset request for the multimedia asset, wherein the multimedia asset request includes client device information about the requesting client device;
determining, by the system, a client type of the requesting client device based on the client device information;
selecting, by the system from the plurality of multimedia representations, a multimedia representation for the requesting client device based on the playback metric associated with the determined client type and the selected multimedia representation being the highest among the playback metrics associated with the determined client type; and
outputting, by the system to the requesting client device, multimedia representation information corresponding to the selected multimedia representation.

2. The method of claim 1:
wherein the multimedia asset has a unique identifier; and
wherein each of the plurality of multimedia representations is in a different multimedia format.

3. The method of claim 1, wherein the multimedia representation information comprises a streaming multimedia asset universal resource locator.

4. The method of claim 1, further comprising:
obtaining a manifest of the multimedia asset from an origin server associated with the multimedia asset; and
pruning the manifest of the multimedia asset to generate a pruned multimedia asset manifest comprising multimedia representations from the plurality of multimedia representations that are compatible with the requesting client device;

wherein the outputting comprises delivering multimedia representation data corresponding to the pruned multimedia asset manifest to the requesting client device.

5. The method of claim 1, wherein the client device information includes client device context information.

6. The method of claim 1, wherein the client device information includes a measure of recent failed playback attempts at the requesting client device.

7. The method of claim 1, wherein the selected multimedia representation is selected based on encoding needed for playback of the selected multimedia representation on the requesting client device.

8. A system, comprising:
a processor; and
a memory communicatively coupled to the processor, the memory having stored therein computer-executable instructions which when executed by the processor cause the processor to perform operations comprising:
receiving a plurality of client reports from a plurality of client devices, each of the plurality of client reports comprising playback information describing playback of a multimedia representation from a plurality of multimedia representations of a multimedia asset;
determining and storing, based on the plurality of client reports, a plurality of playback metrics, each of the plurality of playback metrics associated with a different combination of a client type and a multimedia representation from the plurality of multimedia representations, and each of the plurality of playback metrics being a probability of successful playback of the associated multimedia representation on a client device of the associated client type, wherein the probability is calculated based on a number of client reports from the plurality of client reports that indicate successful playback of the associated multimedia representation on the associated client type and a number of client reports from the plurality of client reports that indicate failed playback of the associated multimedia representation on the associated client type;
receiving a multimedia asset request for the multimedia asset from a requesting client device, wherein the multimedia asset request includes client device information about the requesting client device;
determining a client type of the requesting client device based on the client device information;
selecting, from the plurality of multimedia representations, a multimedia representation for the requesting client device based on the playback metric associated with the determined client type and the selected multimedia representation being the highest among the playback metrics associated with the determined client type; and
outputting, to the requesting client device, multimedia representation information corresponding to the selected multimedia representation.

9. The system of claim 8, wherein the multimedia asset has a unique identifier and wherein each of the plurality of multimedia representations is in a different multimedia format.

10. The system of claim 8, wherein the multimedia representation information comprises a streaming multimedia asset universal resource locator.

11. The system of claim 8, wherein the computer-executable instructions when executed by the processor further cause the processor to perform operations comprising:
obtaining a manifest of the multimedia asset from an origin server associated with the multimedia asset; and
pruning the manifest of the multimedia asset to generate a pruned multimedia asset manifest comprising multimedia representations from the plurality of multimedia representations that are compatible with the requesting client device;
wherein the outputting comprises delivering multimedia representation data corresponding to the pruned multimedia asset manifest to the requesting client device.

12. The system of claim 8, wherein the client device information includes client device context information.

13. The system of claim 8, wherein the client device information includes a measure of recent failed playback attempts at the requesting client device.

14. A non-transitory computer-readable medium having instructions stored thereon that, in response to execution, cause a system including a processor to perform operations comprising:
receiving a plurality of client reports from a plurality of client devices, each of the plurality of client reports comprising playback information describing playback of a multimedia representation from a plurality of multimedia representations of a multimedia asset;
determining and storing, based on the plurality of client reports, a plurality of playback metrics, each of the plurality of playback metrics associated with a different combination of a client type and a multimedia representation from the plurality of multimedia representations, and each of the plurality of playback metrics being a probability of successful playback of the associated multimedia representation on a client device of the associated client type, wherein the probability is calculated based on a number of client reports from the plurality of client reports that indicate successful playback of the associated multimedia representation on the associated client type and a number of client reports from the plurality of client reports that indicate failed playback of the associated multimedia representation on the associated client type;
receiving a multimedia asset request for the multimedia asset from a requesting client device, wherein the multimedia asset request includes client device information about the requesting client device;
determining a client type of the requesting client device based on the client device information;
selecting, from the plurality of multimedia representations, a multimedia representation for the requesting client device based on the playback metric associated with the determined client type and the selected multimedia representation being the highest among the playback metrics associated with the determined client type; and
outputting, by the system to the requesting client device, multimedia representation information corresponding to the selected multimedia representation.

15. The computer-readable medium of claim 14, wherein the multimedia asset has a unique identifier and wherein each of the plurality of multimedia representations is in a different multimedia format.

16. The computer-readable medium of claim 14, wherein the multimedia representation information comprises a streaming multimedia asset universal resource locator.

17. The computer-readable medium of claim 14, wherein the instructions further cause the system to perform operations comprising:

obtaining a manifest of the multimedia asset from an origin server associated with the multimedia asset; and pruning the manifest of the multimedia asset to generate a pruned multimedia asset manifest comprising multimedia representations from the plurality of multimedia representations that are compatible with the requesting client device;

wherein the outputting comprises delivering multimedia representation data corresponding to the pruned multimedia asset manifest to the requesting client device.

18. The computer-readable medium of claim 14, wherein the client device information includes client device context information.

19. The computer-readable medium of claim 14, wherein the client device information includes a measure of recent failed playback attempts at the requesting client device.

\* \* \* \* \*